Figure 1:
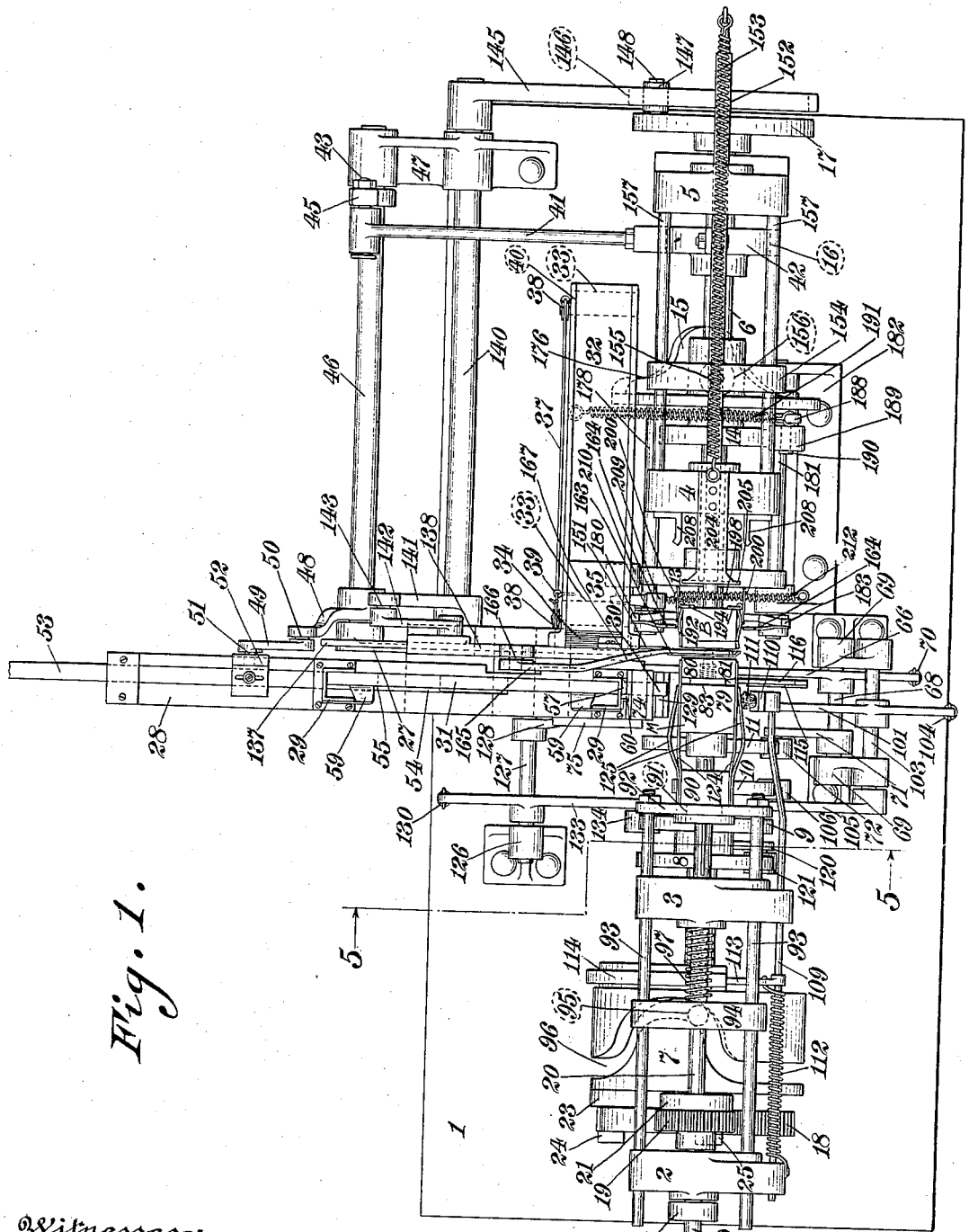

O. W. HANSON.
MACHINE FOR MAKING PAPER BOXES.
APPLICATION FILED SEPT. 3, 1912.

1,085,733.

Patented Feb. 3, 1914.

9 SHEETS—SHEET 1.

Witnesses:
Harry H. Peiss
George G. Anderson

Inventor
O. W. Hanson
By Hugh K. Wagner
His Attorney

O. W. HANSON.
MACHINE FOR MAKING PAPER BOXES.
APPLICATION FILED SEPT. 3, 1912.

1,085,733.

Patented Feb. 3, 1914.

9 SHEETS—SHEET 3.

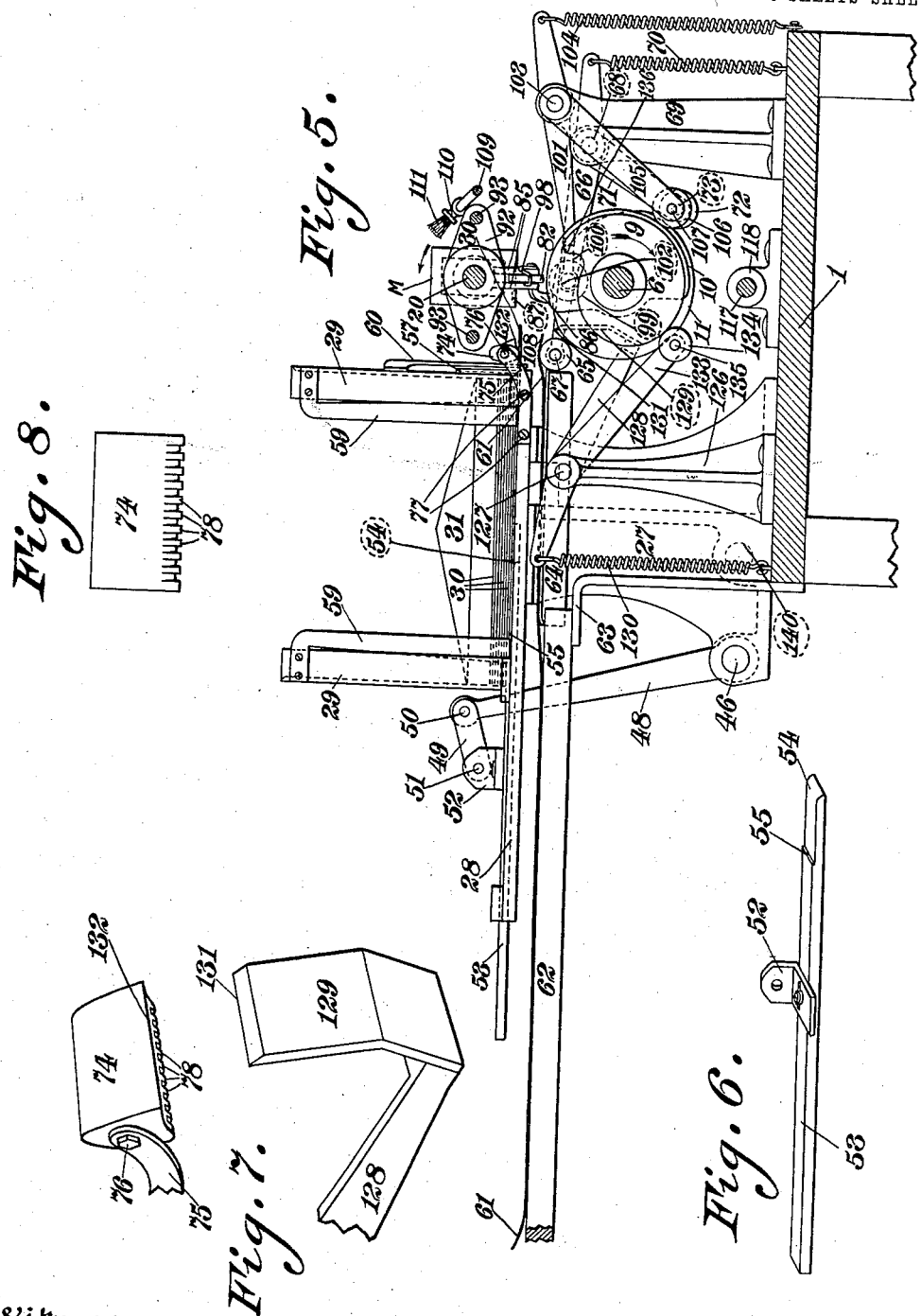

O. W. HANSON.
MACHINE FOR MAKING PAPER BOXES.
APPLICATION FILED SEPT. 3, 1912.

1,085,733.

Patented Feb. 3, 1914.
9 SHEETS—SHEET 5.

O. W. HANSON.
MACHINE FOR MAKING PAPER BOXES.
APPLICATION FILED SEPT. 3, 1912.

1,085,733.

Patented Feb. 3, 1914.
9 SHEETS—SHEET 6.

Witnesses:
Harry H. Reiss.
George G. Anderson.

Inventor:
O. W. Hanson,
By Hugh K. Wagner,
His Attorney.

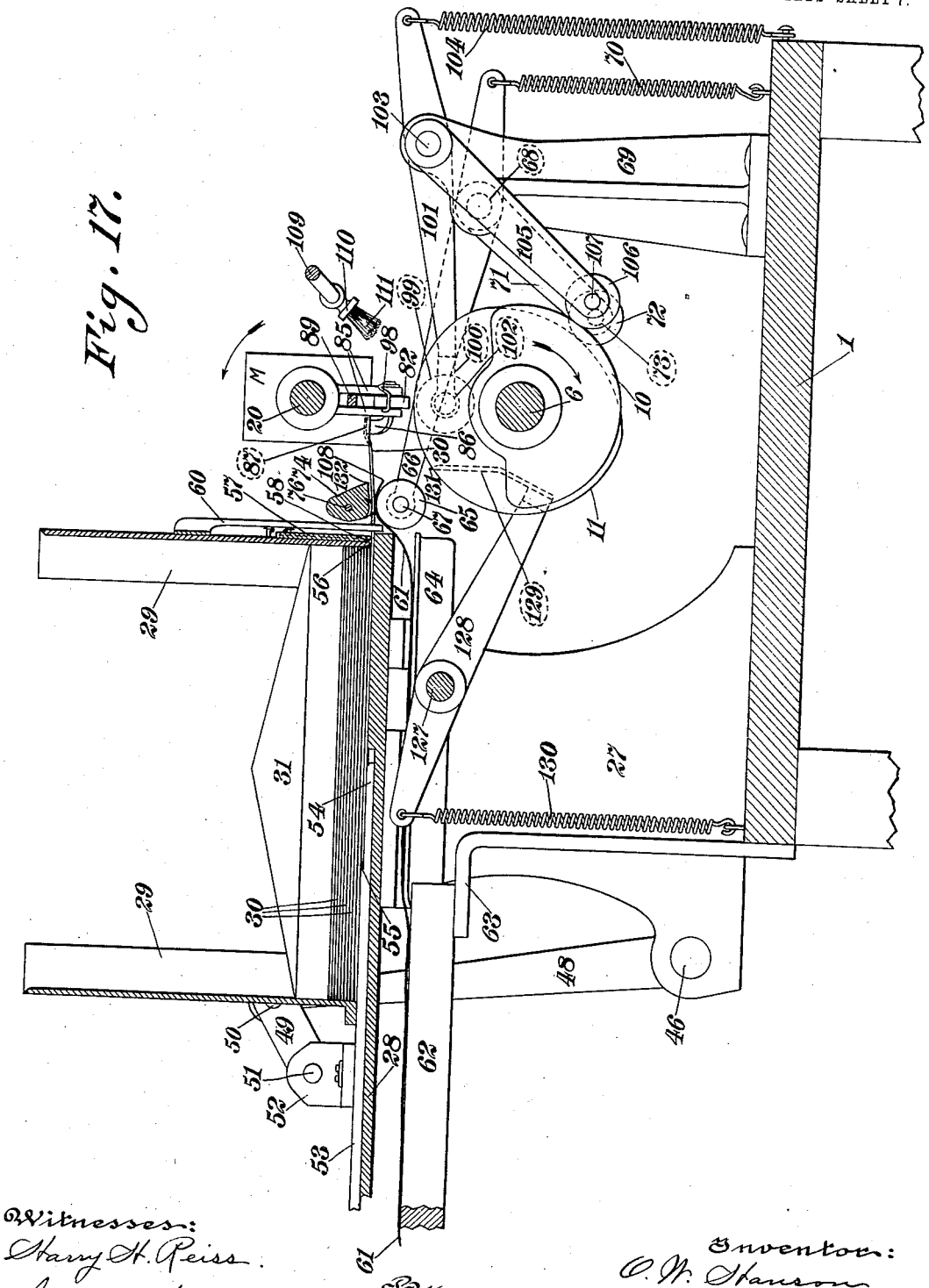

O. W. HANSON.
MACHINE FOR MAKING PAPER BOXES.
APPLICATION FILED SEPT. 3, 1912.

1,085,733.

Patented Feb. 3, 1914.

9 SHEETS—SHEET 8.

Witnesses:
Harry H. Reiss
George G. Anderson

Inventor:
O. W. Hanson
By Hugh K. Wagner
His Attorney.

O. W. HANSON.
MACHINE FOR MAKING PAPER BOXES.
APPLICATION FILED SEPT. 3, 1912.
1,085,733.
Patented Feb. 3, 1914.
9 SHEETS—SHEET 9.
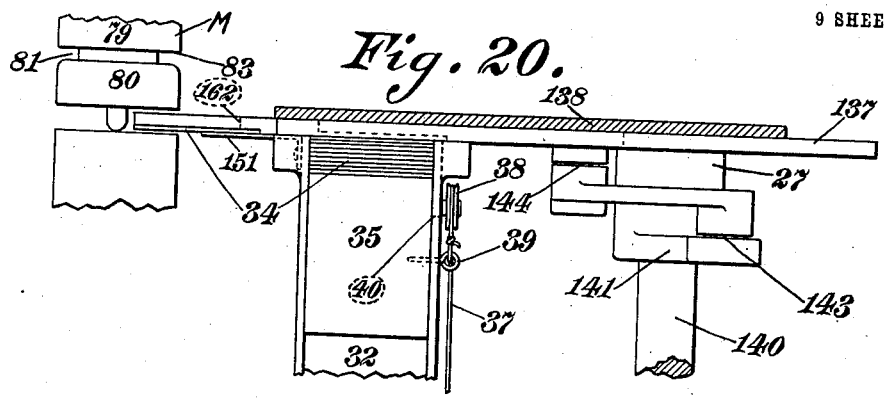
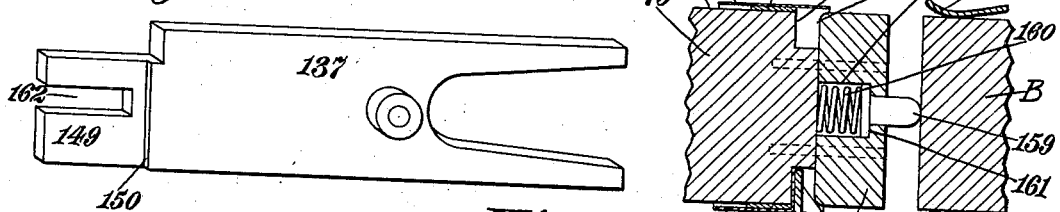
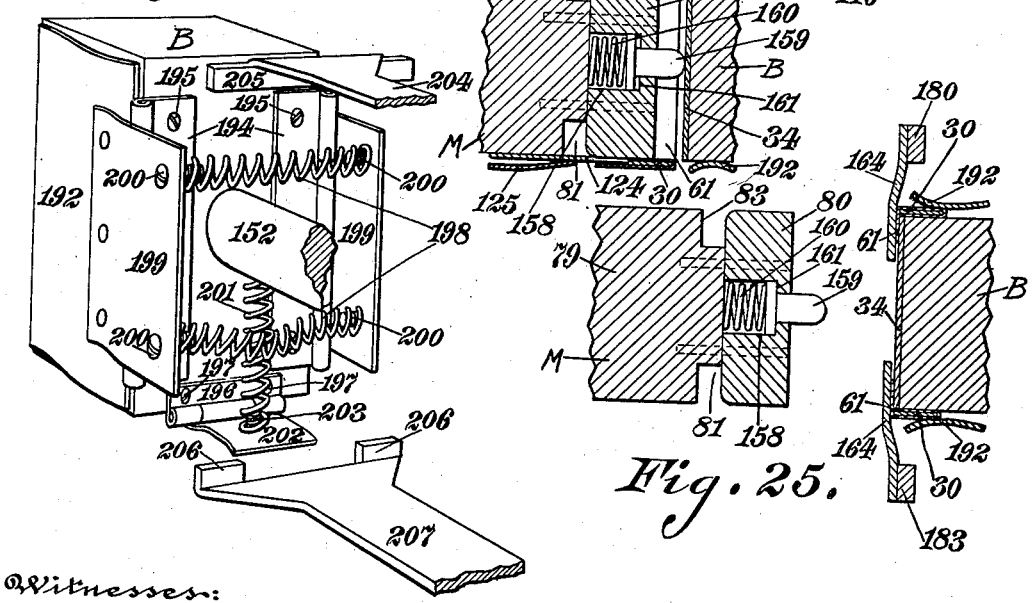
Witnesses:
Harry H. Reiss
George G. Anderson
Inventor:
O. W. Hanson
By Hugh K. Wagner
His Attorney.

UNITED STATES PATENT OFFICE.

OSCAR WILLIAM HANSON, OF TOPEKA, KANSAS, ASSIGNOR TO LOUIS A. ENGEL, OF ST. LOUIS, MISSOURI.

MACHINE FOR MAKING PAPER BOXES.

1,085,733.   Specification of Letters Patent.   Patented Feb. 3, 1914.

Application filed September 3, 1912. Serial No. 718,291.

*To all whom it may concern:*

Be it known that I, OSCAR W. HANSON, a citizen of the United States, residing at the city of Topeka, in the county of Shawnee and State of Kansas, have invented certain new and useful Improvements in Machines for Making Paper Boxes, (Case B,) of which the following is a specification.

The present invention relates to machines for making paper boxes and more particularly to machines designed for producing the body or receptacle portion of a carton, the primary object being to provide a machine of the character described which is adapted for producing a receptacle, which may serve the purpose of either the body portion or the lid portion of a carton.

Another object of the present invention resides in the provision of a machine which simultaneously feeds the blank forming the wall of the box and the wrapper which is secured thereto by means of an adhesive, the blank being projected by a rotating box-forming mandrel and the adhesive strips being subsequently moved into engagement with the blank, and, in conjunction with the novel cam-operated mechanism, bends the blank to form the walls of a rectangular receptacle while the blank is being fed forwardly, the adhesive wrapper at the same time being wrapped upon the stiff blank until the rear end of the wrapper overlaps the forward end thereof before the folded blank is moved to receive the bottom of the box.
Another object of the present invention is to provide novel means for insuring the pasting of the forward end of the adhesive strip upon the blank so that the forward end of the adhesive wrapper is flat and smooth upon the blank before the rear end thereof overlaps same.

Another object of the present invention is to provide novel means for severing the adhesive strip just prior to the projection of the next blank of cardboard and, also, at about the same time the blank has been completely folded around the mandrel, whereby the adhesive strip is in reality severed transversely at such point that the rear end of the adhesive wrapper will be caused slightly to overlap the forward end of same by further movement of the mandrel.

A further object of the present invention is to provide novel means for holding the adhesive strip in engagement with the stiff blank and at the same time holding the blank in engagement with the mandrel, so as to cause the blank to bend around the mandrel and, also, to press the adhesive wrapper into engagement with the blank, whereby the adhesive wrapper will be completely pasted upon the blank before the latter is moved to receive the bottom of the box.

A still further object of the present invention is to provide novel means for folding and tucking in the upper projecting edge of the adhesive strip after the adhesive wrapper has been pasted upon the folded blank and while the latter is still upon the mandrel, so that, when the folded blank is ejected from the mandrel so as to receive the bottom of the box, such folded or tucked in portion of the adhesive wrapper will be pressed against the inner face of the folded blank so as to adhere thereto.

A still further object of the present invention is to provide novel means for holding the revoluble mandrel temporarily stationary in a position in which the faces of same register in the same planes with the corresponding faces of a reciprocatory block, whereby the end of the block will enter and support the folded blank, when the latter is ejected from the mandrel.

A still further object of the present invention is to provide novel means for feeding the bottom of the box to a position in engagement with the reciprocatory block just prior to the ejection of the folded blank from the mandrel, so that the bottom of the box will enter the folded blank.

A still further object of the present invention is to provide novel means for holding the bottom of the box in engagement with the end of the reciprocatory block while the folded blank is being ejected from the mandrel, so that same will enter said blank.

A still further object of the present invention is to provide novel means for folding the lower projecting edge of the adhesive wrapper against the lower face of the bottom of the box while the folded blank is supported upon the reciprocatory block, so that such folded portion of the adhesive wrapper will adhere to the bottom of the box and thereby hold same in place.

A still further object of the present invention is to provide novel means for reciprocating the block so that the latter will travel away from the mandrel while the lower projecting edge of the adhesive wrapper is being folded against the bottom of the box, so that the adhesive wrapper will be prevented from adhering to the folding mechanism.

A still further object of the present invention is to provide novel means for ejecting the completed box from the reciprocatory block.

Further, the present invention contemplates the provision of novel means for discharging the ejected box from the machine so as to prevent same from becoming entangled in the moving parts of the machine.

With the foregoing and other objects in view, the present invention consists of the novel features of construction and arrangement of parts hereinafter described and pointed out in the claims.

Figure 2:
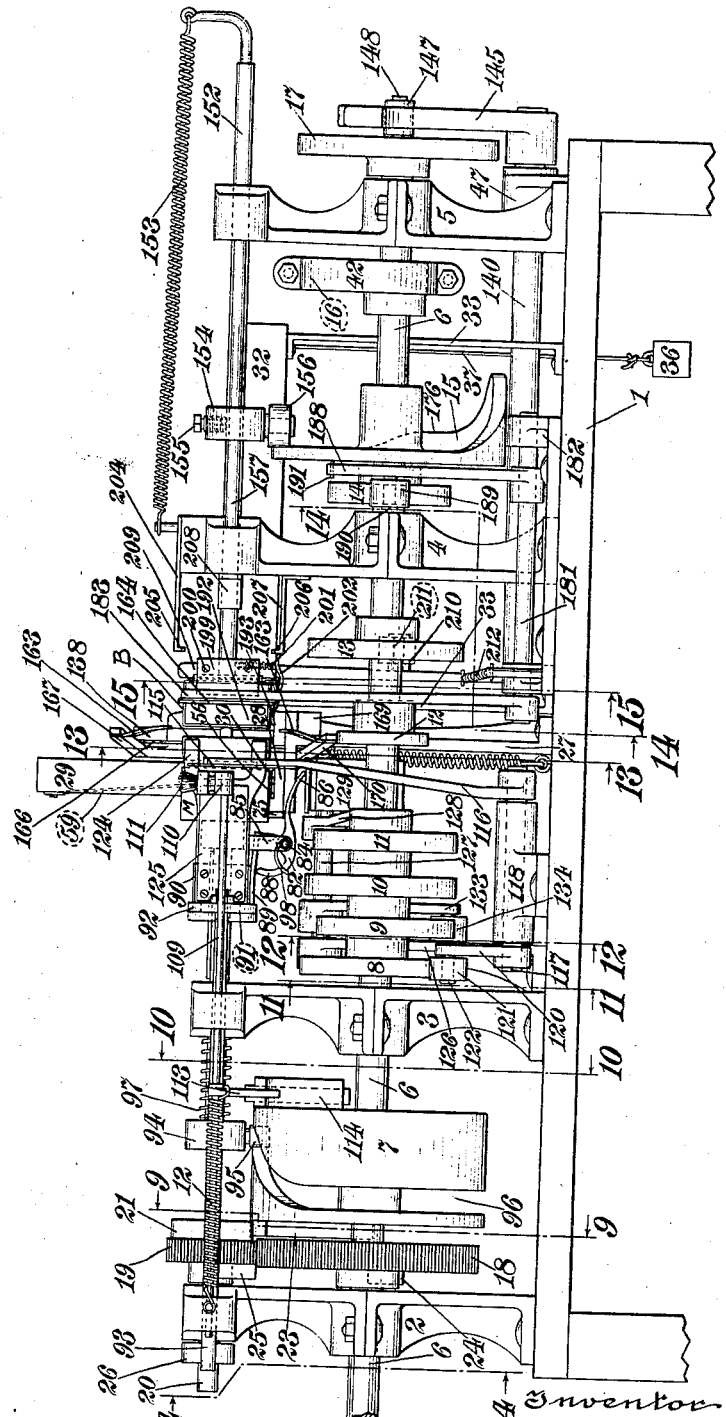
Figure 3:
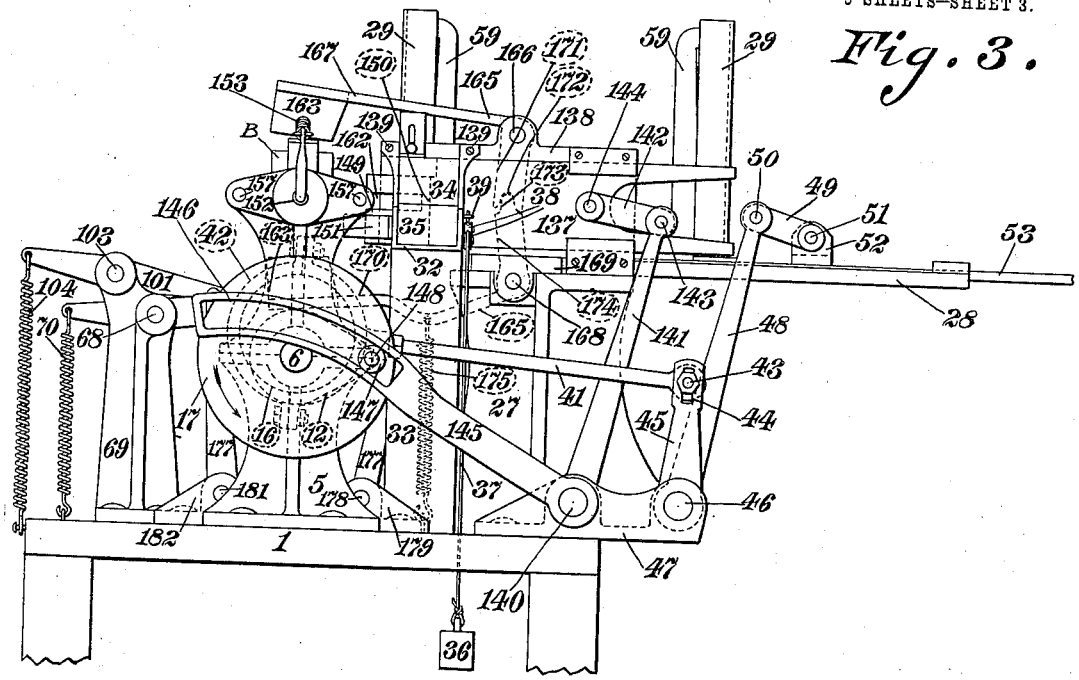
Figure 4:
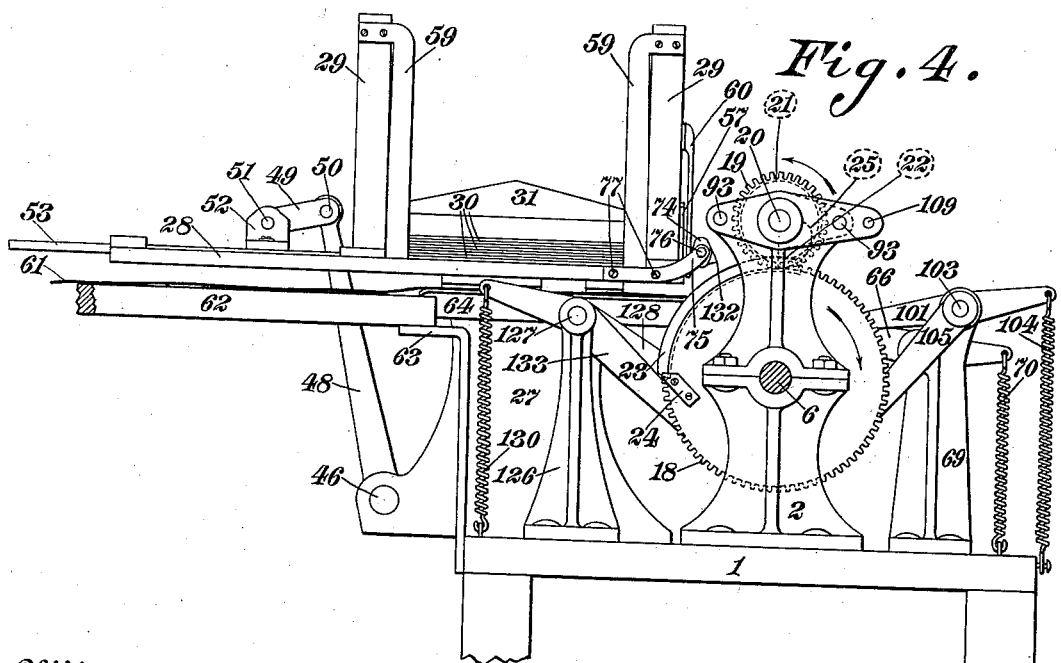
Figure 9:
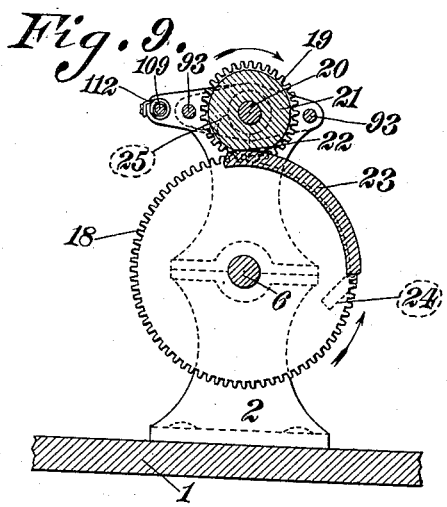
Figure 10:
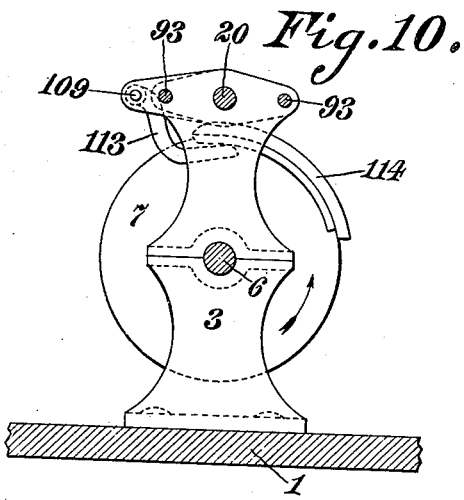
Figure 30:
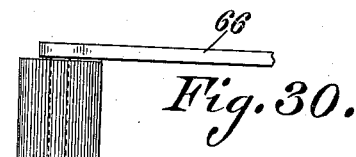
Figure 29:
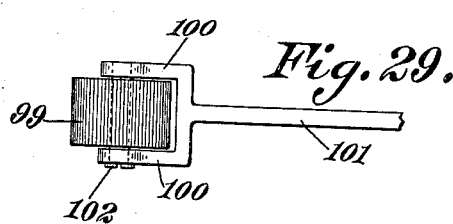
Figure 11:
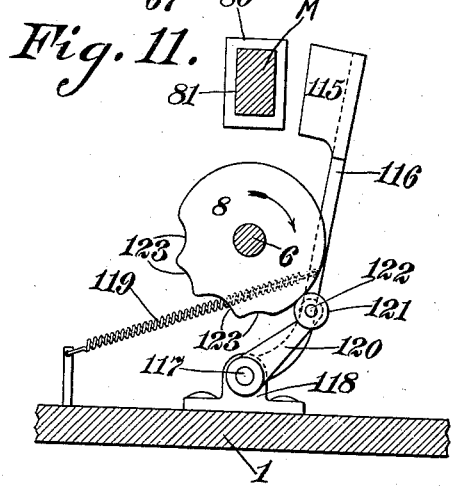
Figure 12:
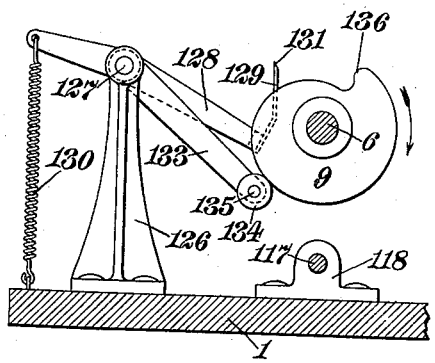
Figure 16:
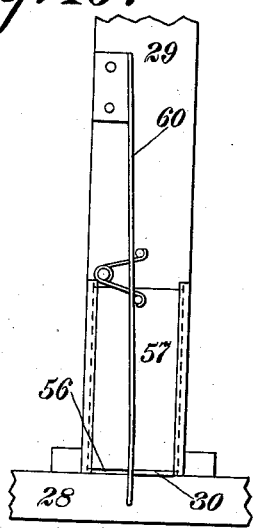
Figure 13:
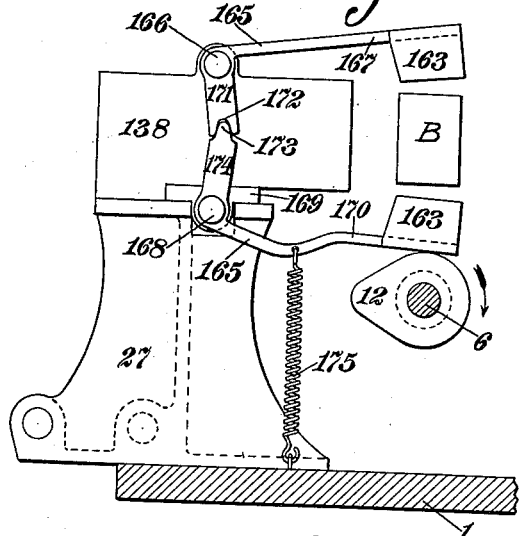
Figure 28:
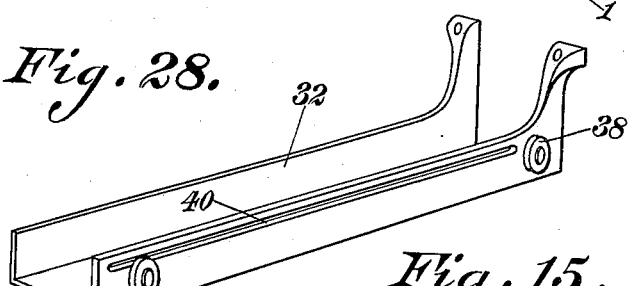
Figure 14:
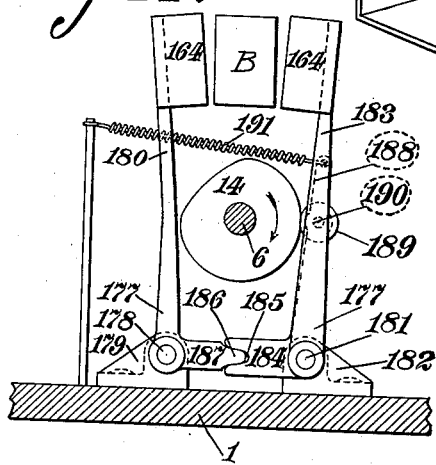
Figure 15:
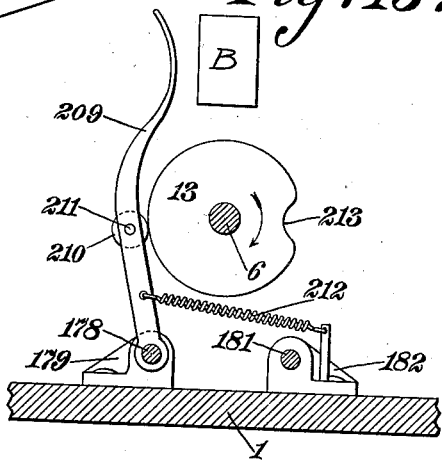
Figure 18:
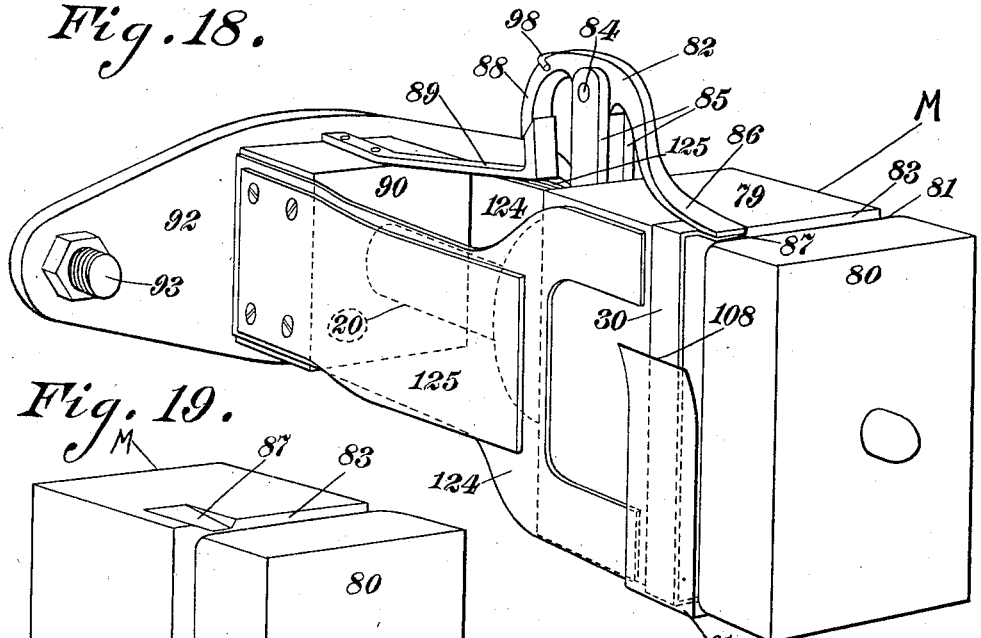
Figure 19:
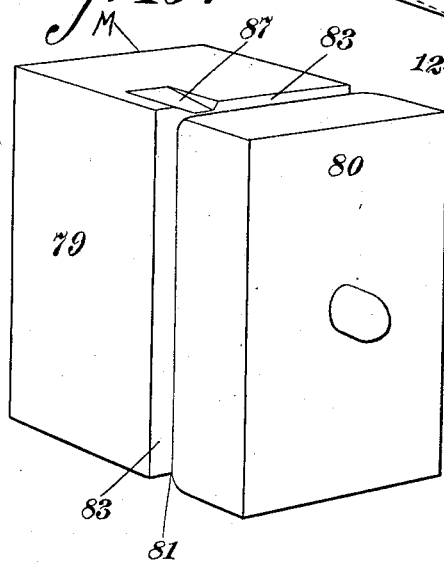
Figure 26:
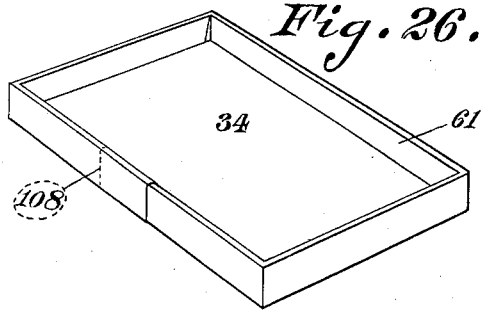
Figure 27:
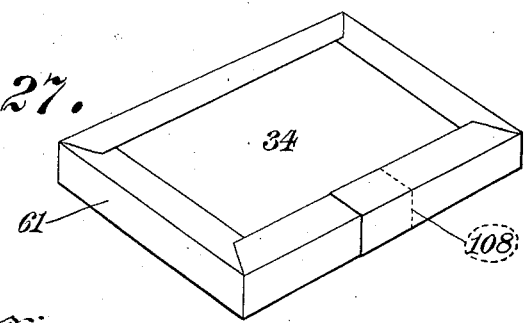

In the accompanying drawings forming a part of this specification, in which like numbers of reference denote like parts wherever they occur, Figure 1 is a top plan view of a machine embodying the present invention; Fig. 2 is a front elevation of same with some of the parts removed; Fig. 3 is a right end elevation of same; Fig. 4 is a sectional view on the line 4—4, Fig. 2; Fig. 5 is a sectional view on the line 5—5, Fig. 1; Fig. 6 is a perspective view of the blank-feeding member; Fig. 7 is a fragmentary perspective view of the adhesive strip-severing mechanism; Fig. 8 is a detailed rear elevation of the upper member of the adhesive strip-severing mechanism; Fig. 9 is a sectional view on the line 9—9, Fig. 2; Fig. 10 is a sectional view on the line 10—10, Fig. 2; Fig. 11 is a sectional view on the line 11—11, Fig. 2; Fig. 12 is a sectional view on the line 12—12, Fig. 2; Fig. 13 is a sectional view on the line 13—13, Fig. 2; Fig. 14 is a sectional view on the line 14—14, Fig. 2; Fig. 15 is a sectional view on the line 15—15, Fig. 2; Fig. 16 is a fragmentary front elevation, on an enlarged scale, of the blank hopper; Fig. 17 is a sectional view, on an enlarged scale, taken through the blank hopper and showing the relative positions of the projecting blank and the adhesive strip, when the latter is raised into engagement with the blank; Fig. 18 is a perspective view, on a large scale, of the mandrel, with blank-clamping device in position to clamp the forward end of the blank; Fig. 19 is a similar view of the mandrel, with the blank-clamping device and the blank-ejecting device removed therefrom; Fig. 20 is a fragmentary plan view of the bottom-containing hopper, the guide for the bottom-feeding member being shown in section; Fig. 21 is a perspective view, on an enlarged scale, of the bottom-feeding member; Fig. 22 is a fragmentary perspective view, on an enlarged scale, of the reciprocatory block and the device for ejecting the completed box from same; Fig. 23 is a detailed sectional view, on an enlarged scale, of a portion of the mandrel and a portion of the reciprocatory block, the blade for folding the upper projecting edge of the adhesive wrapper being shown in operating relation; Fig. 24 is a detailed sectional view, on an enlarged scale, of a portion of the mandrel and a portion of the reciprocatory block, the ejecting plates being shown in such position that same are pushing the folded blank with its adhesive wrapper thereon from the mandrel toward the reciprocatory block; Fig. 25 is a detailed sectional view, on an enlarged scale, of a portion of the reciprocatory block and a portion of the mandrel, one of the pairs of blades for holding the lower projecting edge of the adhesive wrapper against the bottom of the box being shown in operating relation; Fig. 26 is a perspective view of the upper part of the box; Fig. 27 is a perspective view of the lower part of the box; Fig. 28 is a perspective view of the bottom-containing hopper or chute; Fig. 29 is a top plan view, on an enlarged scale, of the forming roller; and Fig. 30 is a top plan view, on an enlarged scale, of the adhesive strip-actuating roller.

In taking up the case for detailed description, the same will be considered under six headings, namely—the frame, which includes the drive shaft, operating cams, the blank-containing hopper, and bottom containing hopper; the blank-and-adhesive-paper-feeding mechanism; the blank-and-adhesive-paper-guide-and-forming mechanism; the paper-cutting mechanism; the bottom-feeding-and-finishing mechanism; and the box-ejecting mechanism.

*The frame.*—The main frame or support 1 of the machine has mounted thereupon the four shaft-carrying supports or journals 2, 3, 4, and 5, which are provided with two vertically alined journals, respectively, whereby the main shaft 6 is properly supported in the lower journals of the four supports 2, 3, 4, and 5, such shaft being disposed longitudinally of the machine and operated through any well known means preferably connected to the left end thereof as viewed in Fig. 2.

In order to operate the several mechanisms, mounted upon the drive shaft 6 are the cams 7, 8, 9, 10, 11, 12, 13, 14, and 15, eccentric 16, and disk or plate 17, so that all such mechanisms are operated directly from the main drive shaft. Mounted upon the drive shaft 6 so as to rotate therewith is a large gear or pinion 18, which meshes with a smaller gear or pinion 19 rigidly mounted on the counter shaft 20, which is revolubly supported in the upper journals of the two supports 2 and 3 and has the mandrel M, secured to the inner end thereof so as to rotate therewith, the detailed description of which will appear later on. The pinion 18 is preferably provided with gear teeth on substantially three-fourths of its periphery, while the gear 19 bears gear teeth on its entire periphery, and by this arrangement, the gear 19 and its shaft 20 will be rotated by the pinion 18, while the latter is being rotated through three-fourths of a revolution by the drive shaft 6, and will remain at rest while the drive shaft is rotating the pinion 18 through the remainder or last quarter of the revolution. The diameter of the pinion 18 is of such size relatively to the diameter of the gear 19 that each time the drive shaft 6 is rotated through a complete revolution, the gear teeth on pinion 18 cause the gear 19 and the counter shaft 20 to rotate through substantially two complete revolutions. In order to prevent rotary movement of the counter shaft 20 while the drive shaft 6 is rotating through the last quarter of a complete revolution, i. e., while the pinion 18 is rotating with its teeth out of engagement with the gear 19, the gear 19 is provided with an extension 21 or the like having an arcuated cut-away portion 22 in its periphery, which cut-away portion 22 is so arranged that, when the gear teeth of pinion 18 pass out of engagement with the gear 19, the cut-away portion 22 will occupy a position concentric with the shaft 6 so as to allow the arcuated projection or plate 23 borne by cam 7 to enter same, said projection or plate 23 being of such length and arranged so that same will travel through the cut-away portion 22 only while the gear teeth of the pinion 18 are out of engagement with the gear 19, thereby preventing the counter shaft 20 temporarily from rotating, but as soon as the gear teeth of pinion 18 again move into engagement with gear 19, the arcuated projection or plate 23 passes out of the arcuated cut-away portion 22 and thereby permits the pinion 18 to rotate the gear 19. In order to cause the gear teeth of pinion 18 to mesh in proper relation with the gear teeth of gear 19, the pinion 18 is provided with a lug 24, which is adapted to strike a lug 25 on gear 19 at the time the gear teeth of pinion 18 are about to engage the gear teeth of gear 19, whereby the gear 19 will be rotated so as to bring the gear teeth thereon in proper relation to the gear teeth of pinion 18, with the result of causing the gear teeth of pinion 18 to mesh properly with the gear 19. In order to prevent longitudinal movement of the counter shaft 20 in the upper journals of supports 2 and 3, the gear 19 is so mounted upon the shaft 20 that its hub is in close proximity to one side of the support 2, and a collar 26, also, mounted on said shaft is placed in close proximity to the other side of said support.

Mounted upon the main frame 1 to the rear of the drive shaft 6 and substantially centrally of the machine, is the supporting plate 27, to which is connected and carried the base plate 28, on which at its forward end adjacent to the mandrel M is carried the blank-containing hopper 29. Said hopper is preferably disposed at substantially a right-angle to the axis of rotation of mandrel M, and contains the blanks 30 of cardboard or the like, said blanks being preferably scored at the points where same are to be folded and being cut to the proper length and so positioned within the hopper that same can be fed one at a time from the bottom thereof, a weight 31, which rests upon the blanks 30, assisting in such feeding as will presently appear. If desired, the ends of each blank 30 may be tapered so that when same overlap, the sides and ends of the complete box will have a substantially uniform thickness.

The bottom-containing hopper or chute 32 is, also, located in the rear of the drive shaft 6 and is supported upon standard 33 or a plurality of such standards mounted upon the main frame 1. Said hopper or chute 32 is preferably disposed substantially parallel to the axis of rotation of the mandrel M, and contains the bottoms 34 of cardboard or the like, said bottoms being preferably cut to the proper size and shape to fit between the side and end walls of the box and being so positioned within the hopper or chute 32 that same can be fed one at a time from one end thereof. In order to assist in such feeding of the hopper or chute 32, a block 35 is provided which is capable of sliding in said hopper or chute and being connected to a weight 36 or the like by means of a flexible member 37, which passes over a pulley 38 or a plurality of such pulleys rotatably attached to said hopper or chute, and by this arrangement, the pull of the weight 36 upon the flexible member 37 causes the block 35 to move the bottoms 34 toward the discharge end of said hopper or chute. A screw-eye 39 or the like, by means of which one end of the flexible member 37 is attached to the block 35, protrudes through a slot 40, which extends longitudinally in one side of the hopper or chute 32, so as to allow the block 35 to slide longitudinally in said hopper or chute, and, also, prevent said block from working out of said hopper or chute.

*The blank-and-adhesive-paper-feeding mechanism.*—This mechanism comprises, essentially, the eccentric-rod 41 one end of which is attached to the eccentric-strap 42, which encircles the eccentric 16, and the other end of which is adjustably connected by means of a bolt or pin 43 in an elongated slot 44 in the arm 45, which is rigidly mounted on the rock-shaft 46, the latter being preferably disposed substantially parallel to the drive shaft 6 and being journaled in the supporting plate 27 and, also, in a support 47 mounted upon the frame 1. By this arrangement, when the drive shaft is rotated, the eccentric 16 causes the arm 45 to oscillate forwardly and rearwardly of the machine through the medium of the eccentric-strap 42 and the eccentric-rod 41 and thereby rocks the shaft 46. Mounted upon the shaft 46 so as to rock therewith is an arm 48 having one end of a link 49 pivoted at 50 thereto, the other end of such link being pivotally attached at 51 to a lug 52 borne by the blank-feeding plate 53. This plate 53 is mounted for longitudinal reciprocation between the guides of the base plate 28 of the blank hopper 29 and is provided with the reduced blank-engaging end 54 having an abrupt shouldered portion 55 upon the upper face thereof, so that upon the forward movement of the plate 53 the lower blank 30 within the hopper 29 will assume the position as shown in Fig. 17 and be propelled through the aperture 56 at the lower end of the hopper 29 and below the spring-depressed gate 57, which has its lower end chamfered as at 58 to permit the passage of the blank, when the latter is propelled forwardly out of the hopper toward the mandrel M by the plate 53, but which, upon the retraction of the plate 53, will snap downwardly and close the aperture 56, so as to prevent the passage of another blank, until the plate 53 has assumed the dotted line position as depicted in Fig. 17. The blanks 30 are held in vertical alinement in engagement with one of the side walls of the hopper 29 by means of a flat spring 59 or the like, or a plurality of such springs, a flat spring 60 or the like being arranged to guide each blank 30 when the latter is fed through the aperture 56.

The strip of paper 61 having an adhesive applied upon one side thereof (preferably the upper side) extends from any suitable source and passes over a plate or board 62, which is supported upon a bracket 63 or the like mounted upon the main frame 1, and then over a guide 64 located directly below the hopper 29 and secured to the supporting plate 27 by any suitable means. The forward end of the adhesive strip 61 projects beyond the forward end of the guide 64 and normally rests upon a roller 65, which is rotatably attached to the rear end of a lever 66 by means of a pin 67 or the like, said lever being rigidly mounted on a shaft 68, which is journaled in supports 69 mounted upon the main frame 1. A spring 70, which is attached to the forward end of lever 66, pulls same downwardly and thereby raises the rear end of said lever, so as to cause the roller 65 to raise the forward end of adhesive strip 61 for the purpose about to be described, such movement of said lever 66 being controlled by the cam 11 through the instrumentality of the arm 71 borne by shaft 68 and having a roller 72 rotatably attached thereto by means of a pin 73 or the like, said roller 72 being held at all times in engagement with the cam 11 by means of the spring 70. The cam 11 is positioned upon the drive shaft 6 so as to permit of this raising of the roller 65 by the pull of spring 70 at the same time the blank 30 has been fed forwardly out of the hopper 29 sufficiently to allow the forward end thereof to be caught by the gripping device carried by the mandrel M, as will be presently described, whereby said roller 65 raises the forward end of the adhesive strip 61 into engagement with the blank 30, as depicted in Fig. 17, and holds said strip into engagement with said blank until same adheres to the latter, after which the cam 11 will rock the shaft 68 counter-clockwise, Fig. 17, through the medium of the lever 71 and thereby cause the lever 66 to lower the roller 65, and the blank 30 will draw the adhesive strip 61 forwardly therewith until the latter is severed in the manner hereinafter described.

A member 74, which is located in front of the hopper 29 and directly above the roller 65, is secured firmly to a bracket 75 or a plurality of such brackets by screws 76, the bracket being secured to the base plate 28 adjacent to the forward end thereof by screws 77 or other suitable means. Said member 74 is disposed at a slightly higher elevation than the aperture 56 in the hopper 29 so that, when the blank 30 is fed forwardly through the aperture as hereinabove described, said blank will pass underneath the member 74, and, when the adhesive strip 61 is raised into engagement with the blank 30, said member will coact with the roller 65, so as to press the adhesive strip 61 into engagement with the blank 30 with sufficient pressure to cause said strip to adhere to said blank. The lower surface of member 74 is grooved transversely to form ribs 78, which provide the proper contact surface for the blank 30 and strip 61 during the projection thereof to the mandrel M, and at the same time not to have sufficient surface to retain any too great amount of the adhesive from the strip 61 that might interfere with the feeding of the blank and strip to said mandrel. For the same reason, the roller 65 is preferably corrugated longitudinally.

*The blank-and-paper-forming mechanism.*—The mandrel M is preferably formed with a rectangular cross-sectional configuration, and consists of the main or initial forming block 79 and the auxiliary or final forming block 80, which may be formed integrally with said main forming block or secured thereto by any suitable means, there being a perimetrical groove 81 in said mandrel between said blocks for the purpose hereinafter described, and the edges of the auxiliary or final forming block 80 adjacent the groove 81 being preferably rounded so as to allow the folded blank to pass readily over said block 80, when said blank is ejected from the main forming block 79 as hereinafter described. Said mandrel is so positioned relative to the hopper 29 that, when a blank is fed forwardly out of said hopper toward said mandrel until same is caught by the blank-clamping lever 82 and folded against the flat faces of the main forming block 79, one edge of said blank, preferably the particular edge that becomes the upper edge of the completed box, will be flush with the wall 83 of the groove 81. The blank-clamping lever 82 has somewhat the shape of a bell-crank, and is pivotally attached at 84 to a lug 85 or a plurality of such lugs borne by the mandrel M, the arm 86 of said lever being adapted to clamp the forward end of the blank 30 in a notch 87 in the main forming block 79, and the arm 88 of said lever being disposed in the path of movement of a hook 89 or the like borne by member 90, which is splined upon the shaft 20 so that same can be reciprocated longitudinally on said shaft. In order to reciprocate the member 90 upon the shaft 20, said member is provided with an annular reduced portion 91, which is revolubly fitted in an opening in a plate 92, said plate being preferably connected to a pair of rods 93, which rods are mounted for longitudinal movement in apertures in the supports 2 and 3. By this arrangement, when the rods 93 are reciprocated, the plate 92 travels therewith and causes the member 90 to reciprocate upon the shaft 20. Said rods 93 extend through openings in a block 94, and are secured to said block by any suitable means, said block being slidably mounted upon the shaft 20 and having a roller 95 rotatably attached thereto, which roller projects into a cam-slot 96 in cam 7. A spring 97 exerts its pressure against one side of the block 94 and thereby holds the roller 95 in engagement with one side of the cam-slot 96. The cam-slot 96 is so arranged that during each rest period of the shaft 20, same reciprocates the block 94 upon the shaft 20 and thereby causes the member 90 to move toward and away from the mandrel M, and the hook 89 to move away from the end of the arm 88 of the lever 82, whereupon the spring 98 rocks the lever 82 clockwise to the position depicted in Fig. 2, thereby moving the clamping arm 86 of said lever out of the notch 87 in the main forming block 79. While the lever 82 occupies such position, the blank 30 is fed forwardly out of the hopper 29 so as to move the forward end thereof to a position between the clamping arm 86 of the lever 82 and the notch 87 in the forming block 79, at which time the member 90 will have been moved away from the mandrel M sufficiently to bring the hook 89 into engagement with the end of the arm 88 of lever 82, thereby rocking the lever 82 counter-clockwise, Fig. 2, with the result of causing the arm 86 of said lever to clamp the forward end of the blank 30 in the notch 87 in the forming block 79, as best seen in Fig. 17. This clamping of the forward end of the blank 30 in the notch 87 in block 79 takes place just prior to the completion of the rest period of mandrel M, so that when the latter is rotated the blank 30 will be drawn forwardly by same. The end of the hook 89 remains in engagement with the end of the arm 88 of the lever 82, while the mandrel M is rotated, and thereby causes the clamping arm 86 to hold the forward end of the blank 30 in the notch 87 in the block 79 until the folded blank with the adhesive strip 61 covering same is shifted from the mandrel M during the next rest period of the latter. In order to permit the end of the hook 89 to ride readily upon the arm 88 of lever 82, when the member 90 moves the hook 89 away from the mandrel M, the ends of said hook and arm are beveled as best seen in Fig. 18. As hereinabove described, the mandrel M rotates with the shaft 20 and, as the gear 19 is of such size relative to the pinion 18 that said shaft 20 will be rotated two complete revolutions for each complete revolution of the drive shaft 6, the mandrel M will, in consequence, be rotated two complete revolutions during each reciprocation of the blank-feeding plate 53.

In order to hold the blank 30 in engagement with the main forming block 79 of the mandrel M and at the same time press the adhesive strip 61 in engagement with the blank 30 so as to fold said blank and said strip around said forming block 79 while the mandrel M is being rotated, a roller 99 is provided, same being preferably located underneath the mandrel M and being revolubly attached to the prongs 100 of the forked end of a lever 101 by means of a bolt or pin 102, said lever being rigidly mounted upon a shaft 103, which is journaled in supports 69. A spring 104, which is connected to the other end of the lever 101, exerts a tension to hold the roller 99 up to and in engagement with the main forming block 79 of mandrel M, but in order to impart the desired movement to the roller 99, the arm 105, which is, also, rigidly mounted on the shaft 103, has a roller 106 rotatably attached thereto by means of a pin 107 or the like, said roller 106 being held in engagement with the cam 10 by the pull of spring 104 so that said cam will actuate the roller 99 through the medium of arm 105, shaft 102, and lever 101 during the rotation of the drive shaft 6. The cam 10 is so positioned upon the drive shaft 6 with respect to the mandrel M that while the blank 30 is fed forwardly out of the hopper 29 by the blank-feeding plate 53 until the forward end thereof is clamped in the notch 87 in the main forming block 79 of mandrel M by the arm 86 of the lever 82, the cam 10 holds the lever 101 in the position depicted in Fig. 17 through the medium of the arm 105 and the shaft 103 and thereby holds the roller 99 out of engagement with the adhesive strip 66. The roller 99 is held in the position just described until the blank 30 causes the forward end of the adhesive strip 61 to pass over the roller 99, after which the cam 10 allows the roller 99 to be raised into engagement with the adhesive strip 61 by the pull of spring 104, whereby said roller not only presses the adhesive strip 61 into engagement with the blank 30, so as to cause same to adhere thereto, but, also, holds the blank 30 in engagement with the main forming block 79 of the mandrel M, with the result of bending or folding said blank and strip completely around said block. When thus folded around the forming block 79 of the mandrel M, the rear end of the blank 30 will overlap the forward end thereof, and during such folding operation, the adhesive strip 61 will be severed in the manner hereinafter described, so that the rear end thereof will overlap the forward end of same upon the folded blank, thereby to cover the latter completely. After the rear end of the severed adhesive strip 61 overlaps the forward end thereof, the cam 10 restores the roller 99 to the position depicted in Fig. 17 and retains same in such position until the next blank 30 is being drawn forwardly by the mandrel M as hereinabove described. By this means, the blank 30 is folded into a rectangular shape against the flat faces of the main forming block 79 of the mandrel M, while the latter is being rotated, and is held in such shape by the adhesive wrapper 61 after the pressure of the roller 99 is released from said wrapper. If desired, the roller 99 may be corrugated longitudinally for the same reason that roller 65 is corrugated, as hereinabove described. When the adhesive strip 61 is raised into engagement with the blank 30 by the roller 65, as hereinabove described, it may happen that the extreme forward end 108 of said strip will not be pressed into engagement with said blank, but will hang loosely from the blank as depicted in Figs. 17 and 18. In order to insure the pressing of this loose end 108 of the strip 61 into engagement with the blank 30 so that same will adhere to and lie flat upon said blank before the rear end of said strip overlaps same, the following mechanism is provided. A shaft 109, which is journaled in supports 2 and 3, extends beyond the support 3 and has a brush-holder 110 secured thereto so as to rotate therewith, the brush 111 carried by said brush-holder being preferably disposed approximately radially to the shaft 109 and being located in front of and adjacent to the main forming-block 79 of the mandrel M. A spring 112 tends to rotate the shaft 109 counter-clockwise, Fig. 10, and thereby holds the arm 113 borne by said shaft normally in engagement with one of the rods 93, with the result that the end of said arm extends into the path of rotation of an arcuated member or flange 114 borne by cam 7. When the arm 113 occupies the position just described, the brush 111 inclines upwardly as depicted in Fig. 5, so as to be out of the path of rotation of the mandrel M. During each rest period of the mandrel M, the arcuated member or flange 114 borne by cam 7 engages the arm 113 borne by shaft 109 and thereby rocks said shaft clockwise, Fig. 10, or counter-clockwise, Fig. 5, with the result of moving the brush 111 downwardly from the position depicted in Fig. 5 to the position depicted in Fig. 17, and causing said brush to engage the adjacent face of the main forming block 79 of the mandrel M, which at this particular stage of the operation occupies the position to receive the forward end of the blank 30 in the notch 87 in the lower face of said block. After the brush 111 has been moved to the position depicted in Fig. 17, the end of the arm 113 rests upon the arcuated member or flange 114 borne by cam 7 and thereby holds said brush in such position until the mandrel M moves the blank 30 and adhesive strip 61 forwardly sufficiently to bring the loose end 108 of the adhesive strip 61 to a position directly behind the axis of rotation of the shaft 109, as depicted in Fig. 18, at which time the member or flange 114 borne by cam 7 passes out of engagement with the end of arm 113, whereupon the spring 112 rocks the shaft 109 suddenly clockwise, Fig. 17, and thereby causes the brush 111 to wipe or press the loose end 108 of the adhesive strip 61 flatly upon the blank 30, so as to cause same to adhere thereto.

In order that the adhesive strip 61 may be folded in so as to cover both edges of the blank 30, when the latter is folded, an adhesive strip which is relatively wider than the blank 30 is utilized, so that, when the blank and adhesive strip are folded around the forming block 79 of the mandrel M, said strip will extend beyond both edges of the blank and one edge of said strip will project over the perimetrical groove 81 in said mandrel in order to be folded against the wall 83 of said groove by the folding blade 115 in the manner now to be described. This folding blade 115 is carried by the lever 116 which is rigidly mounted on the rock-shaft 117, the latter being journaled in supports 118 mounted upon the main frame 1. A spring 119 exerts a tension to pull the blade 115 toward the mandrel M, but such movement of said blade is controlled by the cam 8 through the medium of arm 120, the latter being rigidly mounted on shaft 117 and having a roller 121 rotatably attached at 122 thereto, which roller is held in engagement with the cam 8 by the pull of spring 119. The cam 8 is provided with a plurality of cam notches 123, which are adapted to permit four movements of the upper free end of the lever 116 toward and away from the mandrel M, while the latter is being rotated through the second complete revolution. These movements of lever 116 are so timed that each time a flat face of the mandrel M is presented to the blade 115, the latter will be moved into and withdrawn from the groove 81, with the result of creasing or folding the adhesive strip inwardly against the wall 83 of said groove as depicted in Fig. 23, so that, when the mandrel has been rotated through the second complete revolution, the four faces of same will have been presented to the folding blade 115 and the edge of the adhesive strip 61 projecting over the groove 81 in the mandrel will have been turned in against the wall 83 of said groove, after which the cam 8 will move the blade 115 to the position depicted in Fig. 11 through the medium of arm 120, shaft 117, and lever 116, and, thereafter, will hold said blade in such position until the adhesive strip upon the next folded blank is ready to be folded so as to cover the upper edge of the box, as just described.

After the edge of the adhesive strip 61 that projects normally over the groove 81 in the mandrel M has been folded in against the wall 83 of said groove, the mandrel M ceases rotating immediately and stops in a position in which the two largest flat faces of the mandrel are substantially perpendicular to the main frame 1 of the machine, and during this rest period of said mandrel the folded blank with the adhesive wrapper thereon is ejected from same by the following means. Connected to the member 90 is a pair of ejecting plates 124, which plates are adapted to reciprocate with the member 90 and thereby slide along the two longest flat faces of the mandrel M, the same being held flatly in engagement with said faces by means of springs 125, respectively, which are, also, secured to said member. While the blank 30 and the adhesive strip 61 are being folded around the main forming block 79 of the mandrel M, as hereinabove described, the member 90 holds the ejecting plates 124 in the position depicted in Fig. 18, so that the ends of said plates are out of engagement with the blank 30, so as to allow the blank to be folded upon the forming block 79. Said ejecting plates 124 are relatively thin so that, when same are moved toward the folded blank 30 upon the forming block 79, the ends will pass underneath the edge of the adhesive strip that projects from the left-hand edge of the folded blank as viewed in Fig. 18, and will thereby engage the edge of said blank. During each rest period of the mandrel M, the member 90 is moved toward said mandrel as hereinabove described, and, in turn, moves the ejecting plates 124 toward the right Fig. 1, whereby the ends of said plates engage the left-hand edge of the folded blank 30 upon the main forming block 79 of the mandrel M and thereby not only eject the folded blank and its adhesive wrapper from said block 79 but cause same to pass or slide over the auxiliary forming block 80 until ejected from the latter to receive a bottom 34 in the manner hereinafter described. When the folded blank with the adhesive wrapper thereon is caused to pass over the auxiliary forming block 80 of the mandrel M, the edge of the adhesive wrapper which was previously folded in against the wall 83 of the groove 81 in said mandrel is tucked or folded in farther by the auxiliary forming block 80 until the same is pressed against the inner faces of the folded blank, before the folded blank is ejected from said block 80. After the folded blank with the adhesive wrapper thereon is ejected from the final or auxiliary forming block 80, the member 90 is moved away from the mandrel M, with the result of moving the ejecting plates 124 toward the left Fig. 1 until the latter are restored to their normal positions so as to allow the next blank 30 and its adhesive strip 61 to be folded upon the main forming block 79 of said mandrel.

From the foregoing, it will be apparent that after the blank-feeding mechanism is operated and the adhesive strip 61 is raised into engagement with the blank 30, the mandrel M being in the position, as clearly shown in Fig. 17, and the clamping arm 86 of lever 82, at this particular time, being held in the position depicted in Fig. 2, so that the forward end of the blank will be clamped in the notch 87 in the main forming block 79 of the mandrel M, as illustrated in Fig. 17, a rotary action is imparted to the mandrel, thus twirling the blank and adhesive strip thereupon while the cam 10, which operates the forming roller 99 through the medium of arm 105, shaft 103, and lever 101, raises said roller and thereby causes same not only to press the adhesive strip into engagement with the blank, but, also, to press the blank into engagement with the main forming block 79 of the mandrel, with the result of rolling and properly folding the blank and adhesive strip about the forming block 79 while the mandrel is rotating through the first complete revolution and approximately one-fourth of the second revolution.

About the time the mandrel M makes the complete revolution, the adhesive strip is severed in the manner hereinafter described, and, during the second complete revolution of the mandrel M, the blank is completely covered with the adhesive strip, and the cam 8 operates the folding blade 115 through the medium of arm 120, shaft 117, and lever 116, with the result of folding in the edge of the adhesive strip that previously projected over the groove 81.

After the mandrel M completes the second complete revolution, same remains at rest while the main drive shaft 6 rotates through approximately one-fourth of a revolution, during which time, the cam slot 96 in cam 7 causes the member 90 to move toward and away from the mandrel, with the result that, while the member 90 is moved toward the mandrel, the ejecting plates 124 push against the left-hand edge of the folded blank upon the main forming block 79, as viewed in Fig. 2, thereby moving the folded blank toward the right until same with the adhesive wrapper thereon passes over the auxiliary forming block 80 of the mandrel, so as to have the folded-in edge of the adhesive wrapper tucked in farther to adhere to the inner faces of the folded blank, and finally leaves the auxiliary forming block 80 in order to receive the bottom 34 of the box in the manner hereinafter described. The movement of the member 90 toward the mandrel M causes the hook 89 to move out of engagement with the end of the arm 88 of lever 82, whereby the clamping arm 86 of said lever releases its pressure upon the end of the blank 30 in the notch 87 in the forming block 79, so as to permit the easy withdrawal of the end of the blank from said notch when the folded blank is ejected from said block. While the member 90 moves away from the mandrel, same restores the hook 89 and the ejecting plates 124 to their initial positions, whereby the hook 89 again engages the arm 88 of lever 82, so as to cause the clamping arm 86 of said lever to clamp the forward end of the next blank 30.

*The paper-cutting mechanism.*—In order to sever the adhesive strip at the proper time, that is, after a strip 61 of such length that the rear end thereof will overlap the forward end of same when wound upon the folded blank upon the main forming block 79 of the mandrel M as hereinabove described, the following mechanism is provided: A standard 126 is mounted upon the main frame 1 of the machine, and has one end of a rock-shaft 127 journaled therein, the other end of said shaft being journaled in the plate 27. A lever 128 is rigidly mounted on shaft 127 and has a blade 129 secured to the forward end thereof. An arm 133 is attached to shaft 127, a coil spring 130 being secured to said arm and to the frame 1 to exert upward tension on arm 128 to cause the cutting edge 131 of the blade 129 to coöperate in shearing relation with the shearing edge 132 borne by the member 74. Arm 133 has a roller 134 rotatably attached at 135 thereto, said roller being held in engagement with the cam 9 by means of the spring 130. The cam 9 is provided with a periphery which, when the adhesive strip 61 is being drawn forwardly by the blank 30 as hereinabove described, holds the cutting edge 131 of the blade 129 below the path of travel of the adhesive strip 61 through the intermediation of the arm 133, shaft 127, and lever 128, as clearly illustrated in Fig. 17. When the proper length of adhesive strip 61 sufficient to cover the folded blank in the manner hereinabove described has been drawn forwardly by the blank, the roller 134 rides off a shoulder 136 on cam 9, whereupon the pull of spring 130 rocks the shaft 127 suddenly in a counter-clockwise direction, Fig. 17, whereby the forward end of the lever 128 raises the blade 129 quickly, with the result that the cutting edge 131 of said blade presses into engagement with the shearing edge 132 on member 74 and thereby severs same at a point in front of the roller 65, so that the forward end of the remaining strip will rest upon said roller after the cutting operation, the rear end of the blank which is being folded upon the main forming block 79 of the mandrel M being, at this particular time, drawn beyond the path of movement of the cutting edge 131 of blade 129 so that only the adhesive strip 61 will be cut thereby. After the cutting operation takes place as just described, the cam 9 lowers the cutting edge 131 of the blade 129 to its normal position so as to allow the next blank 30 to be fed forwardly by the blank-feeding plate 53 as hereinabove described.

*The bottom-feeding-and-finishing mechanism.*—The bottoms 34 occupy an upright position in the hopper or chute 32 and are fed one at a time from the discharge end thereof by means of a feeding plate 137 which is mounted for reciprocation in a guide plate 138, said guide plate being secured to the discharge end of said hopper or chute by screws 139 or other suitable means and being supported upon the supporting plate 27. Mounted upon a rock-shaft 140 so as to rock therewith is an arm 141 having one end of a link 142 pivotally attached at 143 thereto, the other end of said link being pivoted at 144 to the bottom-feeding plate 137, so as to cause same to reciprocate when the shaft 140 is rocked, said shaft being journaled in the supporting plate 27, and, also, in support 47. A lever 145, which is rigidly mounted on shaft 140, is provided with a cam-slot 146, into which an anti-friction roller 147 that is revolubly mounted upon an eccentric pin 148 borne by the disk or plate 17 projects. By this arrangement, when the drive shaft 6 is rotated, the roller 147 upon the eccentric pin 148 borne by the disk or plate 17 causes the lever 145 to rock the shaft 140, which, in turn, rocks the arm 141, with the result of reciprocating the bottom-feeding plate 137. This plate 137 is adapted to move forwardly and rearwardly of the machine and is provided with a reduced bottom-engaging end 149 having an abrupt shoulder 150 upon the face thereof that is adjacent the discharge end of the hopper or chute 32, so that upon the forward movement of the plate 137 the shoulder 150 on the reduced end 149 of said plate will engage the first bottom 34 in the discharge end of the hopper or chute 32 and will move said bottom forwardly in an upright position out of the discharge end of said hopper or chute, as illustrated in Fig. 20, a spring 151 or other suitable device being arranged so as to hold the bottom 34 in engagement with the reduced end 149 of said plate 137 while said bottom is being propelled from the discharge end of said hopper or chute. The bottom-feeding plate 137 is so positioned upon the machine that, when the former is moved forwardly, the reduced forward end 149 thereof will pass between the end of the mandrel M and the end of the finishing block B borne by the inner end of the bar 152, which is mounted for longitudinal reciprocation in the supports 4 and 5, and in this way will move the bottom 34 to a position between the mandrel M and the block B, for the purpose hereinafter described.

The block B is formed with substantially the same size and the same shape in cross-sectional configuration as the mandrel M and is disposed in axial alinement with the mandrel so that, during each rest period of the mandrel, the faces of the latter will register in the same planes with the corresponding faces of the block B, respectively. A spring 153, which may be attached to the outer end of the bar 152 and, also, either to the support 4 or support 5, exerts a tension so as to move the bar 152 toward the left, Figs. 1 and 2, and thereby move the block B toward the mandrel M. A member 154, which is adjustably mounted upon the bar 152 and fastened thereto by means of a set-screw 155 or the like, has a roller 156 rotatably attached thereto, which roller is held in engagement with the cam 15 by the pull of spring 153, and is reciprocatively mounted upon a rod 157, or a plurality of such rods, said rod or rods connecting and being supported by the supports 3 and 4. The cam 15 affords a means not only for limiting the movement of the bar 152 toward the left, Figs. 1 and 2, so that a space is left at all times between the end of the block B and the end of the mandrel M, in order to allow the bottom-engaging end 149 of the bottom feeding plate 137 to pass therebetween, but, also, for moving the bar 152 toward the right so as to move the block B away from the mandrel, and is so positioned upon the drive shaft 6 that, during each rest period of the mandrel M, said cam allows the block B to occupy a position of rest near the mandrel M, but, while the mandrel is being rotated the cam 15 causes the bar 152 to reciprocate and thereby move the block B away from and toward the mandrel before the next rest period of the latter, for the purpose hereinafter described.

The operation of feeding the bottom 34 from the hopper or chute 32 as hereinabove described is timed to take place when the block B is near the mandrel M, i. e., when the block B occupies the position of rest at the end of its travel toward the left, Figs. 1 and 2, so that the bottom-feeding plate 137 will move the bottom 34 to its proper position between the end of the mandrel M and the end of the block B before the folded blank with an adhesive wrapper thereon is ejected from the mandrel as hereinabove described. The auxiliary forming block 80 of the mandrel M contains an opening 158, which is preferably located centrally of the end face thereof. A button 159 is reciprocatively mounted in the opening 158 in the block 79 of the mandrel and a spring 160 presses said button outwardly so that the shank of same protrudes from the end face of said block 79, an offset 161 in said opening being provided to limit the outward movements of said button. The outer end of the shank of the button 159 bears against the end face of the block B when the latter is near the mandrel M as clearly shown in Fig. 23, and is preferably rounded so that, when the bottom-feeding plate 137 moves the bottom 34 out of the hopper or chute 32 to its proper position between the end face of the mandrel M and the end face of the block B, the bottom 34 will readily pass between the rounded end of the button shank and the end face of the block B. The forward end 149 of the bottom-feeding plate 137 is provided with an elongated notch 162 to allow the shank of the button 159 to enter same when the plate 137 is moved forwardly, so that said plate 137 can travel forwardly sufficiently to move the bottom 34 to such position intermediate the end of the mandrel M and the end of the block B that the edges of said bottom will register in substantially the same planes with the corresponding faces of the mandrel and block in order to enter the folded blank with the wrapper thereon, when same is ejected from the mandrel. While the bottom-feeding plate 137 is moving the bottom 34 from the discharge end of the hopper or chute 32, the spring 151 holds the bottom 34 in an upright position in engagement with the end 149 of said plate until the bottom passes between the rounded end of the shank of the button 159 and the block B, after which the pressure of the spring 160 causes the button 159 to hold the bottom in an upright position in engagement with the flat end face of the block B, as depicted in Fig. 24. After the bottom 34 has been moved to its proper position between the end of the mandrel M and the end of the block B as just described, the plate 137 moves rearwardly and thereby leaves the bottom 34 in its proper position in engagement with the end face of the block B, then the ejecting plates 124 eject the folded blank and its wrapper from the mandrel and cause same to move toward the right, Fig. 24, thereby causing the folded blank with its wrapper thereon to slide upon the bottom 34 and, also, upon the block B until the left-hand edge of the folded blank is substantially flush with the outer face of the bottom 34, after which the ejecting plates return to their normal position and thereby leave the folded blank upon the bottom 34 and the block B. Thus, the folded blank embraces the bottom 34 and the block B, which, in turn, supports same until the completed box is finally ejected from the machine. After the folded blank is moved to its proper position upon the bottom 34 and the block B as hereinabove described, the edge of the adhesive wrapper that projects from the left-hand edge of the folded blank as viewed in Fig. 24, is folded against the outer face of the bottom 34 by means of the mechanism now to be described, so that the adhesive wrapper will connect the bottom with the folded blank and thereby complete the box. This mechanism for folding the projecting edge of the adhesive wrapper against the outer face of the bottom 34 comprises two pairs of folding blades, namely, the blades 163, which are adapted to fold the edge of the adhesive wrapper at the ends of the box against the outer face of the bottom, and the blades 164, which are adapted to fold the edge of the adhesive wrapper at the sides of the box against the outer face of the bottom. The blades 163 are secured to the levers 165, respectively, by any suitable means, each of which levers is preferably in the form of a bell-crank. One of the levers 165 is pivoted at 166 to the guide plate 138, so that its blade-supporting arm 167 extends above the block B, and the other lever 165 is pivotally mounted at 168 in a bearing 169, so that its blade-supporting arm 170 extends below the block B, said bearing 169 being supported by the supporting plate 27 and secured thereto by any suitable means. The arm 171 of the upper lever 165 contains a notch 172 in the end thereof to receive a gear tooth or projection 173 borne by the end of the arm 174 of the lower lever 165, and by this arrangement, when one lever 165 is rocked on its pivot, same causes the other lever 165 to rock simultaneously therewith, but in the opposite direction therefrom. A spring 175 holds the blade-supporting arm 170 of the lower lever 165 in engagement with the cam 12, which affords the means for operating the levers 165 at the proper time. The blades 163 register in substantially the same vertical plane with the outer face of the bottom 34, which is held in engagement with the end of block B, while the block is near the mandrel, as hereinabove described, and normally occupy the positions depicted in Fig. 13.

After the ejecting plates 124 have ejected the folded blank with its wrapper from the mandrel M and shifted same so as to embrace the bottom 34 and the block B, and the ejecting plates have retracted to leave the folded blank in such position, the cam 12 presses the arm 170 of the lower lever 165 upwardly and thereby raises the lower blade 163, while said lower lever, through the instrumentality of its arm 174 and arm 171 of the upper lever 165, causes the arm 167 of said upper lever to descend and lower the upper blade 163 simultaneously therewith, with the result that said blades 163 engage the projecting edge of the adhesive wrapper at the ends of the folded blank and not only fold same over the edge of the end walls of the folded blank, but, also, press same flatly into engagement with the outer face of the bottom 34, whereby same adheres to said bottom. Simultaneously with the completion of pressing the projecting edge of the adhesive wrapper flatly against the outer face of the bottom 34 at the ends of the latter by the folding blade 163 as just described, the cam 15, through the intermediation of roller 156, member 154, and bar 152, causes the block B to move the folded blank 30 and its bottom 34 away from the mandrel M so as to move the bottom 34 immediately out of engagement with the folding blades 163, after which the cam 12 permits the pull of spring 175 to return the blades 163 to their initial position. By this arrangement the adhesive wrapper 61 is moved out of engagement with the blades 163 before same has a chance to adhere to the latter, in case any of the adhesive material accidentally runs upon said blades.

After the cam 15 causes the block B to move away from the mandrel M, i. e., toward the right, Figs. 1 and 2, through the intermediation of roller 156, member 154, and bar 152, the roller 156 rides upon the surface 176 of said cam and thereby holds the block B in such position that the outer face of the bottom 34 registers in the same vertical plane with the folding blades 164, during which time said blades are actuated so as to fold the projecting edge of the adhesive wrapper at the sides of the folded blank against the outer face of the bottom 34 of the box, in the manner now to be described.

The folding blades 164 are secured to the levers 177, respectively, by any suitable means, each of which levers is preferably in the form of a bell-crank. One of the levers 177 is rigidly mounted on a shaft 178 journaled in a support 179, which is mounted on the main frame 1, so that its blade-supporting arm 180 extends behind the block B, and the other lever 177 is rigidly mounted on a shaft 181 which is journaled in a support 182 so that its blade-supporting arm 183 extends in front of the block B, said support 182 being mounted on the main frame 1. The arm 184 of the front lever 177 contains a notch 185 in the end thereof to receive a gear tooth or projection 186 borne by the end of arm 187 of the rear lever 177, and by this arrangement, when one lever 177 is rocked, same causes the other lever 177 to rock simultaneously therewith, but in the opposite direction therefrom. An arm 188 borne by the shaft 181 has a roller 189 rotatably attached at 190 thereto, said roller being held in engagement with the cam 14 by means of a spring 191, which cam affords the means for actuating the folding blades 164 at the proper time. The blades 164 normally occupy the position depicted in Fig. 14, but while the roller rides upon the surface 176 of cam 15 and thereby holds the block B in such position that the outer face of the bottom 34, which has been partly connected to the folded blank upon said block as hereinabove described, registers in substantially the same plane with the folding blades 164, the cam 14 permits the spring 199 to pull the arm 188 borne by shaft 181 rearwardly, thus causing the shaft 181 to rock the forward lever 177 counter-clockwise, Fig. 14, whereby the arm 183 of said forward lever moves the forward folding blade rearwardly toward the block B, while said forward lever, through the instrumentality of its arm 184 and the arm 187 of the rear lever 177, causes the arm 180 of said rear lever to move the rear folding blade 164 forwardly toward the block B simultaneously therewith, with the result that said folding blades 164 engage the projecting edge of the adhesive wrapper at the sides of the folded blank and not only fold same over the edge of the end walls of the folded blank, but, also, press same flatly into engagement with the outer face of the bottom 34, whereby same adheres to said bottom. This operation completes the formation of the box, which is depicted in Figs. 26 and 27, whereupon the cam 15 immediately causes the block B to move the completed box farther away from the mandrel M, in order to prevent the adhesive wrapper from adhering to the folding blades 164, in case any of the adhesive material accidentally runs upon the folding blades 164, and, also, to eject the completed box from the machine in the manner hereinafter described.

In order to afford a means for positively holding the folded blank in its proper position upon the block B and, also, to insure against accidental ejectment of the folded blank from the block B, while the edge of the adhesive wrapper is being folded against the outer face of the bottom 34 to complete the formation of the box, a pair of plates 192 and a plate 193 are provided. The plates 192 are arranged so as to press against the side faces of the block B where the sides of the folded blank embrace same adjacent the end face thereof and are hinged to the plates 194, respectively, which plates 194 are secured to the block B by screws 195 or other suitable means. In like manner the plate 193 is arranged so as to press against the lower face of the block B where the end of the folded blank embraces same adjacent the end face thereof and is hinged to a plate 196 which is secured to the block B by screws 197 or other suitable means. Said plates 192 are held in pressing engagement with the side faces of the block B by a spring 198 or a plurality of such springs, said spring or springs being arranged to press against extensions 199 borne by said plates 192, respectively, and being held in place by screws 200, which are attached to said extensions. A spring 201 is arranged to press against the extension 202 borne by plate 193 so as to hold the latter in pressing engagement with the lower face of the block B and is held in place by a screw 203 which is attached to said extension 202. The edges of the plates 192 and 193 that are adjacent the end face of the block B are preferably bent so as to flare outwardly from the block B, in order to allow the folded blank to slide readily upon said block. When the folded blank is ejected from the mandrel M and caused to slide upon the bottom 34 and the block B as hereinabove described, the sides of the folded blank pass between the side faces of the block B and the flared edges of the plates 192, and the lower end of the folded blank passes between the lower faces of the block B and the flared edge of the plate 193, with the result that the pressure of springs 198 and 201 cause the plates 192 and 193 to hold the sides and the lower end of the folded blank in engagement with the side and lower faces, respectively, of the block B, thereby holding the folded blank firmly in place and preventing accidental displacement of same while the projecting edge of the adhesive wrapper is being folded and pressed against the outer face of the bottom 34.

*The box-ejecting mechanism.*—After the operation of folding and pressing the projecting edge of the adhesive wrapper 61 against the bottom 34 to complete the formation of the box as hereinabove described, the cam 15 causes the block B to move farther away from the mandrel M in order to eject the finished box from the machine in the following manner. A member 204 which is secured to the support 4 by any suitable means bears a downwardly-projecting edge 205, which, when the block B moves the finished box toward the right, Figs. 1 and 2, slides upon the upper face of the block B and engages the upper end of the finished box, while, at the same time, lugs 206 borne by member 207, which is, also, secured to the support 4, slide upon the lower face of block B and thereby engage the lower end of the completed box, with the result of ejecting the completed box from said block. Simultaneously with this operation of ejecting the finished box from the block B, the ends of the extension 199 of the plates 192 pass between and in engagement with the members 208 which, in turn, move said extensions toward each other and thereby cause the plates 192 to release their pressure upon the sides of the box, so as to allow the box to be readily ejected from the block B as just described. In order to permit the extensions 199 of the plates 192 to pass readily between the members 208, the ends of the latter are bent so as to flare outwardly, as best seen in Fig. 1.

In order to prevent the completed boxes from accumulating in a pile below the block B and, also, from being broken by the moving parts of the machine, as each box is ejected from the block B, same is thrown toward the front of the machine by the lever 209 in the following manner. The lever 209 is loosely mounted on the shaft 178 and is located in the rear of the block B. A roller 210, which is rotatably attached at 211 to the lever 209, is held at all times in engagement with the cam 13 by the pull of spring 212, which exerts a tension to pull the lever 209 forwardly. The cam 13 holds the lever 209 in the position depicted in Fig. 15 until the finished box is ejected from the block B, at which time the pull of spring 212 causes the roller 210 to enter the notch 213 in the periphery of the cam 13 and thereby rocks the lever 209 forwardly. This movement of the lever 209 is rapid and takes place immediately after the finished box is ejected from the block B, so that the upper end of said lever will strike the rear side of the finished box, with the result of throwing the latter toward the front of the machine where same may fall into a suitable receptacle, chute, conveyer, or the like (not shown in the drawings). After the finished box is ejected from the machine, the cam 13 returns the lever 209 to its normal position, after which the cam 15 permits the pull of spring 153 to return the block B to its initial position so that it will be in the proper position to receive the next bottom and the next folded blank that are fed toward same in the manner hereinabove described.

While the machine of the present invention is primarily for producing the body or receptacle portion of a carton, yet it should be understood that, *mutatis mutandis*, same may be utilized not only for producing the body portion of the carton, but, also, for producing the neck portion of the carton, and, furthermore, for assembling the body and neck portions. It should be, also, understood that the product of the machine of this invention may be utilized not only for the body portion of a carton, but, also, for the lid of the carton.

From the foregoing description, the operation of the machine will be readily understood and needs no further description.

I claim:

1. In a box making machine, means to fold a blank and apply an adhesive strip thereto so that one of the edges of the strip projects beyond the adjacent edge of the blank, means to receive the blank and strip, means to feed a bottom into the blank and strip, pressing means on each side of the receiving means for simultaneously pressing both of the sides of said strip edge against the bottom, pressing means on each end of the receiving means spaced from the side pressing means for simultaneously pressing both of the ends of said strip edge against the bottom, means for successively actuating the side and end pressing means of the strip, and means to move the receiving means to present the blank, bottom and strip to each of the said side and end pressing means.

2. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and adhesive strip from said mandrel while the latter is at rest, bottom-feeding mechanism adapted to feed the bottom of the box into the path of the ejected blank and strip, so that the bottom will enter the latter, a reciprocatory member disposed to receive the bottom and the ejected blank and strip, means for folding the edge of the adhesive strip against the bottom, and means separate from and movably connected to said member for holding the folded blank and strip in place upon said member while the edge of the strip is being folded against the bottom.

3. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and adhesive strip from said mandrel while the latter is at rest, bottom-feeding mechanism adapted to feed the bottom of the box into the path of the ejected blank and strip, so that the bottom will enter the latter, a reciprocatory member disposed to receive the bottom and the ejected blank and strip, means for folding the edge of the adhesive strip against the bottom, means separate from and movably connected to said member for holding the folded blank and strip in place upon said member while the edge of the strip is being folded against the bottom, and means for ejecting the finished box from said member.

4. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and adhesive strip from said mandrel while the latter is at rest, bottom-feeding mechanism adapted to feed the bottom of the box into the path of the ejected blank and strip, so that the bottom will enter the latter, a reciprocatory member disposed to receive the bottom and the ejected blank and strip, means for folding the edge of the adhesive strip against the bottom, means separate from and movably connected to said member for holding the folded blank and strip in place upon said member while the edge of the strip is being folded against the bottom, means for ejecting the finished box from said member, and means for discharging the ejected box from the machine.

5. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and strip from said mandrel while the latter is at rest, bottom-feeding mechanism adapted to feed the bottom of the box into the path of the ejected blank and strip, so that the bottom will enter the latter, a reciprocatory member disposed in the path to receive the bottom and the ejected blank and strip, means for folding the edge of the adhesive strip against the bottom, and releasable means for holding the folded blank and strip in place upon said member while the edge of the adhesive strip is being folded against the bottom.

6. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and strip from said mandrel while the latter is at rest, bottom-feeding mechanism adapted to feed the bottom of the box into the path of the ejected blank and strip, so that the bottom will enter the latter, a reciprocatory member disposed in the path to receive the bottom and the ejected blank and strip, means for folding the edge of the adhesive strip against the bottom, releasable means for holding the folded blank and strip in place upon said member while the edge of the adhesive strip is being folded against the bottom, and means for ejecting the finished box from said member.

7. A box-making machine comprising blank and adhesive strip feeding mechanism, the adhesive strip being relatively wider than the blank, an intermittently revoluble mandrel disposed in the path to receive the forward end of the blank and to wind the blank and adhesive strip thereupon, means for bending the blank and adhesive strip during the rotation of said mandrel, means for ejecting the folded blank and strip from said mandrel while the latter is at rest, bottom-feeding mechanism adapted to feed the bottom of the box into the path of the ejected blank and strip, so that the bottom will enter the latter, a reciprocatory member disposed in the path to receive the bottom and the ejected blank and strip, means for folding the edge of the adhesive strip against the bottom, releasable means for holding the folded blank and strip in place upon said member while the edge of the adhesive strip is being folded against the bottom, means for ejecting the finished box from said member, and means for releasing said holding means while the finished box is being ejected from said member.

8. A box-making machine comprising a frame, a drive shaft mounted thereon, blank feeding mechanism operatively connected with said drive shaft, a rotary mandrel operatively connected with said drive shaft so as to be rotated intermittently thereby and disposed in the path to receive the forward end of the blank and to fold the blank thereupon, means operatively connected with said drive shaft for feeding an adhesive strip to the blank to be wound upon said mandrel, the adhesive strip being relatively wider than the blank, means operatively connected with said drive shaft for bending the blank and adhesive strip during the rotation of said mandrel, means operatively connected with said drive shaft for ejecting the folded blank and adhesive strip from said mandrel while the latter is at rest, bottom feeding mechanism operatively connected with said drive shaft for feeding the bottom of the box into the path of the ejected blank and strip so that the bottoms will enter the latter, a reciprocatory member operatively connected with said drive shaft disposed in the path to receive the bottom and the ejected blank and strip, spaced similar independent means operatively connected with said drive shaft and successively actuated by the latter for folding the ends and sides of the edge of the adhesive strip against the bottom, each of said similar independent means acting to simultaneously force each of the respective ends and sides of the adhesive strip against the bottom, said member when reciprocated by the drive shaft acting to present the blank, bottom and strip to each of said means that force the sides and ends of the strip against the bottom.

9. In a box making machine, a mandrel, means to feed a blank and an adhesive strip to said mandrel, means to actuate the mandrel to wind the blank and strip thereon, ejecting means for the folded blank and strip, means to feed a bottom into the blank and strip, means to receive the bottom and the folded blank and strip, means to force the strip against the bottom, and means separate from and movably connected to said member to positively hold the folded blank and strip upon said receiving means while the strip is being engaged with the bottom.

10. In a box making machine, a mandrel, means to feed a blank and an adhesive strip to said mandrel, means to actuate the mandrel to wind the blank and strip thereon, ejecting means for the folded blank and strip, means to feed a bottom into the blank and strip, means to receive the bottom and the folded blank and strip, means to force the strip against the bottom, and spring actuated means to positively hold the folded blank and strip upon said receiving means while the strip is being engaged with the bottom.

11. In a box making machine, a mandrel, means to feed a blank and an adhesive strip to said mandrel, means to actuate the mandrel to wind the blank and strip thereon, ejecting means for the folded blank and strip, means to feed a bottom into the blank and strip, means to receive the bottom and the folded blank and strip, means to force the strip against the bottom, and pivoted spring pressed devices on said receiving means to positively hold the folded blank and strip thereon, and means to engage said devices to actuate same to release their pressure against the blank and strip.

12. In a box making machine, a mandrel, means to feed a blank and an adhesive strip to said mandrel, means to actuate the mandrel to wind the blank and strip thereon, ejecting means for the folded blank and strip, means to feed a bottom into the blank and strip, means to receive the bottom and the folded blank and strip, means to force the strip against the bottom, and pivoted devices on said receiving means, means to force one of the ends of said devices inwardly against the receiving means, and relatively stationary means to engage the opposite ends of said devices to move said opposite ends inwardly and thereby move the first named ends outwardly away from the receiving means to release the completed structure.

13. In a box making machine, means to fold a blank and apply an adhesive strip thereto so that the opposite edges of the strip project beyond the respective edges of the blank, means to fold one edge of the strip on the interior of the blank, means to receive the blank and strip, means to feed a bottom into the blank and strip, means including a pair of members to press each of the sides of the other edge of the strip against the bottom, means including a pair of members spaced from said first named pressing means to press each of the ends of said other edge of the strip against the bottom, means to move the receiving means and therewith the blank and bottom to cause the latter to register with said strip end pressing means, and means to successively actuate each of said pressing means.

14. In a box making machine, means to fold a blank and apply an adhesive strip thereto so that one of the edges of the strip projects beyond the adjacent edge of the blank, means to receive the blank and strip, means to feed a bottom into the blank and strip, spaced similar independent pressing means each including a plurality of members for pressing the sides and ends respectively of said strip edge against the bottom, means for successively actuating said pressing means and means to move the receiving means from one pressing means to the other.

In testimony whereof I hereunto affix my signature in the presence of two witnesses.

OSCAR WILLIAM HANSON.

Witnesses:
CHAS. W. BENNETT,
E. E. ROUNDEBUSH.